United States Patent Office 3,344,124
Patented Sept. 26, 1967

3,344,124
MORPHOLINIUM QUATERNARY MODIFIER FOR USE ON PREFORMED POLYMERIC STRUCTURES
Jack J. Press, 12–18 E. Laurelton Parkway, Teaneck, N.J. 07666
No Drawing. Filed July 20, 1964, Ser. No. 384,003
6 Claims. (Cl. 260—79.3)

The invention described herein may be manufactured and used by or for the Government of the United States of America for governmental purposes without the payment of any royalties thereon or therefor.

This invention relates to a new ionic complex for use as a modifier for textiles. More particularly, this invention relates to a modifier for use as an anti-static agent for preformed polymeric materials.

Polyacrylic acid, as such, has had limited use as a sizing for synthetic fibers and as a stiffening finish for textiles. This is due to the fact that polyacrylic acid is inherently deficient in several respects, viz., it is very hydrophilic and water soluble. When utilized as a sizing, it exhibits poor adhesion, poor durability, and poor wetting characteristics with respect to hydrophilic synthetic fibers.

We have found that because polyacrylic acid has a high level of ionic functionality, it will react strongly with fatty morpholine and morpholinium compounds to give a novel ionic complex which, as a sizing, exhibits highly improved wetting and penetrating characteristics, good adhesion, good durability and very low static propensities. Also, the coating produced on the textile is highly resistant to leaching and laundering. Where a stiff finish with good soil resistance is desired, a lower ionic ratio of alkyl morpholine ot polyacrylic acid may be used. To further improve launder resistance, the coating can be cured to cross-link the polymer.

An object of this invention is to provide a modifier for preformed polymeric material.

Another object is to provide a complex for use as an anti-static modifier for textiles.

Other objects and many of the attendant advantages of this invention will be readily appreciated as the same become better understood by reference to the following detailed description.

This invention relates to complexes of fatty morpholinium quaternary compounds with soluble or dispersed homo- and copolymers made by addition polymerization with unsaturated acid or acid-forming monomers. This includes complexes formed between cetyl ethyl morpholinium ethosulfate and polyacrylic acid or copolymers of acrylic acid and acrylic ester. The range of ionic molar ratios of acid groups to amine lies between 10:1 and 1:1. If the ratio is greater than 10/1, the action of the modifier as an anti-static agent is impaired. This is accompanied by a decrease in the resistance of the modifier to leaching and laundering. However, with ratios lower than 1/1, the modifier is soft and there is a corresponding decrease in the resistance of the fabric to soiling.

The following are examples of the preparation and use of complexes embraced by the present invention.

PREPARATION 1

(a) 30 gms. of 33⅓% cetyl ethyl morpholinium ethosulfate paste were diluted with water to 1000 mls. to give a 1% dispersion.

(b) 25 gms. of a 40% aqueous dispersion of a copolymer of acrylic acid and ethyl acrylate were diluted to 1000 mls. to give a 1% dispersion. The copolymer had an ionic equivalent molar weight of 266 per carboxy group.

(c) 50 mls. of the 1% copolymer dispersion prepared above in (b) were mixed with 10 mls. of the morpholinium dispersion prepared in (a) above to give a uniform 7:1 molar dispersion of one of the complexes of this invention.

Application 1

Individual samples of polyethylene and Mylar polyester films were dipped in each of the dispersions prepared in Preparation 1, subparagraphs a, b, and c. The films were then drained, dried, and the observed appearance, feel and electrical resistivity were noted.

TABLE 1

| Treat | Resistivity $\times 10^{10}$ ohms | Polyethylene Appearance—Feel | Polyester Appearance—Feel |
|---|---|---|---|
| a | 5,000 | Streaks—oily | Streaks—oily. |
| b | 5,000 | Spots—flakes | Spots—flakes. |
| c | 10 | Clear—hard | Clear—hard. |

RESULTS

As shown in the table above, the treatment with the complex (c) formed between cetyl ethyl morpholinium ethosulfate (a) and the copolymer of acrylic acid and ethyl acrylate (b) is more effective than when either of the ingredients a or b of the complex is used alone to treat the polymeric film.

PREPARATION 2

(c) 40 grams of a 25% aqueous solution of polyacrylic acid were diluted to a 10% solution with water.

(d) 30 grams of a 33⅓% aqueous paste of cetyl ethyl morpholinium ethosulfate were diluted to a 10% solution with 70% isopropanol. At this point various quantities of a and b were mixed together to give a number of separate uniform dispersions each of which was utlized to treat nylon taffeta.

Application 2

Individual samples of nylon taffeta were dipped in separate dispersions of a complex prepared as described above. The samples were then drained, dried, and conditioned at 70° F. and 65% R.H. prior to testing for static propensity. The results of such tests are listed in Table 2.

TABLE 2

| cc. C/cc. D | Molar Ratio | Resistivity ($\times 10^{10}$ ohm/sq.) |
|---|---|---|
| Blank | | 500 |
| 10/50 | 1/1 | 0.01 |
| 15/50 | 1.5/1 | 0.015 |
| 50/50 | 5/1 | 0.6 |

RESULTS

In all cases, the static propensity of nylon taffeta was drastically reduced after treatment with the various dispersions of the complex prepared in accordance with the procedure outlined in the 2nd preparation section of this application.

Application 3

A 10% solution of a complex prepared in accordance with the procedure outline in preparation 2 was utilized to treat nylon, Dacron, Orlon, and Dynel. The complex had an ionic molar ratio of acid groups to amine of 1.5/1. Each of the synthetic materials was dipped in a solution of the complex, drained, and dried. The treated fabrics were then laundered twice, in accordance with the procedure set forth in method 5556, Federal Test Method CCC–191b, tested for electrical resistivity, and the results are tabulated below:

TABLE 3

| | Electrical Resistivity ($\times 10^{10}$ ohms/sq.) of— | | | |
|---|---|---|---|---|
| | Nylon | Dacron | Orlon | Dynel |
| Blank | 600 | 3,000 | 4,000 | 1,000 |
| Treated | 0.06 | 0.01 | 0.01 | 0.01 |
| Laundered | 6 | 1.5 | 8 | 8 |

RESULTS

As indicated in the table above, the electrical resistivity of each of the fabrics is drastically reduced by treatment with a complex embraced by this invention. Although laundering somewhat increases the static propensity of the treated fabric above that of the treated but unlaundered fabric, the propensity does not in any way approach that exhibited by the untreated (blank) fabric.

It is obvious in view of the foregoing that the complexes embraced by this invention are successful as antistatic agents for use on textiles. There are many modifications and variations of the present invention which are possible in view of the above teaching. For instance, the use of the present complex need not be restricted to fabrics but may be used to impart anti-static resistance to films, plastics, and other non-conducting surfaces. It is therefore to be understood that these modifications and variations are to be included within the scope of the appended claims.

I claim:
1. An organic complex formed between an alkyl and alkosulfate fatty morpholinium quaternary compound and an addition polymer selected from the group consisting of polyacrylic acid homopolymer, and acrylic acid and acrylic ester copolymer, said organic complex having an ionic molar ratio of amine to acid groups between a ratio of 1:10 to 1:1.
2. An organic complex of claim 1 wherein the addition polymer is polyacrylic acid.
3. An organic complex of claim 1 wherein the addition polymer is a coploymer formed between acrylic acid and ethylacrylate.
4. An organic complex of claim 1 wherein the fatty morpholinium quaternary compound is cetyl ethyl morpholinium ethosulfate.
5. An organic complex formed between cetyl ethyl mopholinium ethosulfate and polyacrylic acid wherein the ionic ratio of amine to acid groups is between a ratio of 1:10 to 1:1.
6. An organic complex formed between cetyl ethyl morpholinium ethosulfate and a copolymer of acrylic acid and ethyl acrylate wherein the ionic ratio of amine to acid groups is between a ratio of 1:10 to 1:1.

References Cited

UNITED STATES PATENTS

| 2,074,647 | 3/1937 | Hagedorn et al. | 96—87 |
| 2,570,094 | 10/1951 | Bradley | 260—79.3 |
| 2,983,628 | 5/1961 | Henneman et al. | 117—139.5 |

JOSEPH L. SCHOFER, *Primary Examiner.*

JAMES A. SEIDLECK, *Examiner.*

H. WONG, *Assistant Examiner.*